US011068658B2

(12) United States Patent
Mandt et al.

(10) Patent No.: US 11,068,658 B2
(45) Date of Patent: Jul. 20, 2021

(54) DYNAMIC WORD EMBEDDINGS

(71) Applicant: Disney Enterprises, Inc., Burbank, CA (US)

(72) Inventors: Stephan Marcel Mandt, Pittsburgh, PA (US); Robert Bamler, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 893 days.

(21) Appl. No.: 15/828,884

(22) Filed: Dec. 1, 2017

(65) Prior Publication Data

US 2018/0157644 A1 Jun. 7, 2018

Related U.S. Application Data

(60) Provisional application No. 62/431,224, filed on Dec. 7, 2016.

(51) Int. Cl.
*G06N 3/04* (2006.01)
*G06N 5/04* (2006.01)
*G06F 40/30* (2020.01)
*G06N 20/00* (2019.01)
*G06F 40/284* (2020.01)

(52) U.S. Cl.
CPC ............ *G06F 40/30* (2020.01); *G06F 40/284* (2020.01); *G06N 3/0454* (2013.01); *G06N 5/04* (2013.01); *G06N 20/00* (2019.01)

(58) Field of Classification Search
CPC ....... G06F 40/30; G06F 40/284; G06N 20/00; G06N 5/04; G06N 3/0454
See application file for complete search history.

(56) References Cited

U.S. PATENT DOCUMENTS 9,037,464 B1   5/2015  Mikolov et al.
2016/0085853 A1*  3/2016  Zelevinsky ........... G06F 16/338
                                                              707/765
2016/0247061 A1*  8/2016  Trask ....................... G06N 3/04

OTHER PUBLICATIONS

Ryan Cotterell, Hinrich Schutze, and Jason Eisner. Morphological smoothing and extrapolation of word embeddings.Proceedings of the 54th Annual Meeting of the Association for Computational Linguistics, pp. 1651-1660, Berlin, Germany, Aug. 7-12, 2016. (Year: 2016).*

(Continued)

*Primary Examiner* — Hal Schnee
(74) *Attorney, Agent, or Firm* — Patterson + Sheridan, LLP

(57) ABSTRACT

Systems, methods, and articles of manufacture to perform an operation comprising deriving, based on a corpus of electronic text, a machine learning data model that associates words with corresponding usage contexts over a window of time, according to a diffusion process, wherein the machine learning data model comprises a plurality of skip-gram models, wherein each skip-gram model comprises a word embedding vector and a context embedding vector for a respective time step associated with the respective skip-gram model, generating a smoothed model by applying a variational inference operation over the machine learning data model, and identifying, based on the smoothed model and the corpus of electronic text, a change in a semantic use of a word over at least a portion of the window of time.

20 Claims, 9 Drawing Sheets

(56) References Cited

OTHER PUBLICATIONS

William L Hamilton, Jure Leskovec, and Dan Jurafsky. Sep. 2016. Diachronic Word Embeddings Reveal Statistical Laws of Semantic Change. arXiv preprint arXiv:1605.09096v4 (2016) (Year: 2016).*
Roy Schwartz, Roi Reichart, and Ari Rappoport. 2015. Symmetric pattern based word embeddings for improved word similarity prediction. CoNLL 2015 (2015), 258. (Year: 2015).*
Boffy, A. Large scale Singular Value Decomposition and applications in Machine Learning, Sep. 2007. (Year: 2007).*
Mikolov et al., "Distributed Representations of Words and Phrases and their Compositionality," arXiv:1310.454v1 [cs.CL], Oct. 16, 2013, 9 pages.
Oren Barkan, "Bayesian Neural Word Embedding," Proceedings of the Thirty-First AAAI Conference on Artificial Intelligence (AAAI-17), 2017, 9 pages.
Kim et al., "Temporal Analysis of Language through Neural Language Models," New York University, Google Inc., Oct. 4, 2001, 5 pages.
Hamilton et al., "Diachronic Word Embeddings Reveal Statistical Laws of Semantic Change," Department of Science, Standford University, arXiv:1605.09096v4, [cs.CVL] Sep. 26, 2016, 13 pages.
Maja Rudolph and David Blei, "Dynamci Bernoulli Embeddings for Language Evolution," Columbia University, arXiv:1703.08052v1 [stat.ML] Mar. 23, 2017, 11 pages.
Robert Bamler and Stephan Mandt, "Dynamic Word Embeddings," Proceedings of the 34th International Conference on Machine Learning, Sydney, Australia, PMLR, 70, 2017, 10 pages.

* cited by examiner

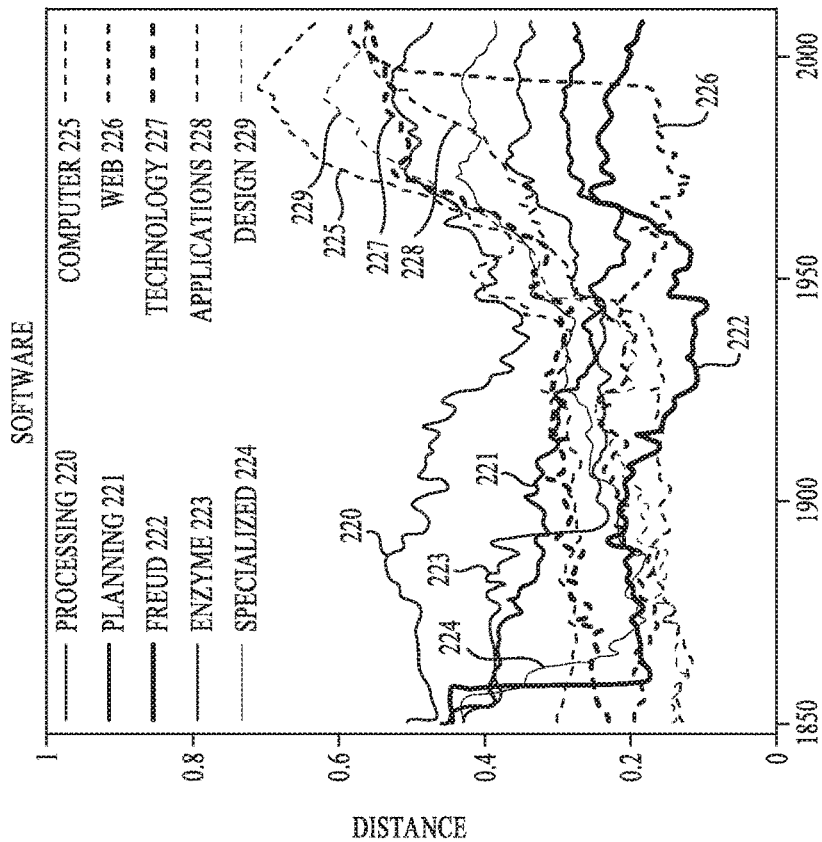
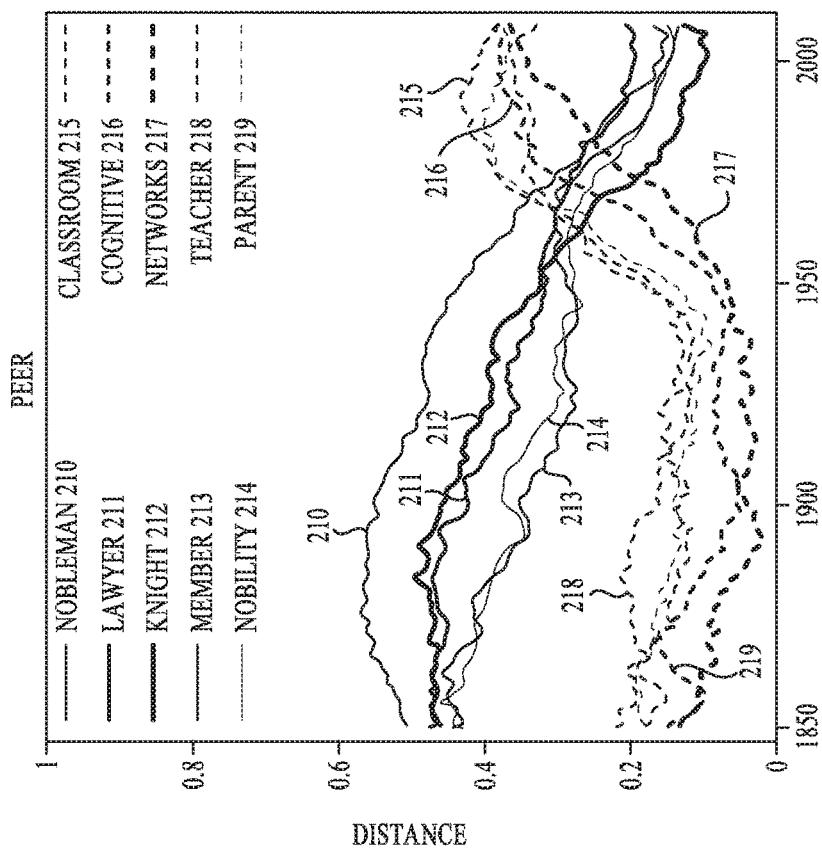
FIG. 2

DYNAMIC WORD EMBEDDINGS

CROSS-REFERENCE TO RELATED APPLICATIONS

This application claims benefit of U.S. provisional patent application Ser. No. 62/431,224 filed Dec. 7, 2016, which is herein incorporated by reference in its entirety.

BACKGROUND

Field of the Invention

The present disclosure relates to word embeddings. More specifically, the present disclosure relates to machine learning techniques for determining dynamic word embeddings.

Description of the Related Art

Word embeddings model the distribution of words based on their surrounding words, based on a mathematical embedding from a space with one dimension per word to a continuous vector space with lower dimensions. Geometric distances between word vectors in the vector space reflect the degree of semantic similarity between words, while difference vectors encode semantic and syntactic relations between words. Conventionally, word embeddings have been formulated as static models. These static models assume that the meaning of any given word is the same across the entire text corpus, regardless of the time any given element of text was written. However, language evolves over time, and words can change their meaning (e.g., due to cultural shifts, technological innovations, and/or other events). Therefore, conventional static word embeddings have been unable to detect shifts in the meaning and use of words over time.

SUMMARY

In one embodiment, a method comprises deriving, based on a corpus of electronic text, a machine learning data model that associates words with corresponding usage contexts over a window of time, according to a diffusion process, wherein the machine learning data model comprises a plurality of skip-gram models, wherein each skip-gram model comprises a word embedding vector and a context embedding vector for a respective time step associated with the respective skip-gram model, generating a smoothed model by applying a variational inference operation over the machine learning data model, and identifying, based on the smoothed model and the corpus of electronic text, a change in a semantic use of a word over at least a portion of the window of time.

In another embodiment, a system comprises a processor and a memory storing a program, which when executed by the processor, performs an operation comprising deriving, based on a corpus of electronic text, a machine learning data model that associates words with corresponding usage contexts over a window of time, according to a diffusion process, wherein the machine learning data model comprises a plurality of skip-gram models, wherein each skip-gram model comprises a word embedding vector and a context embedding vector for a respective time step associated with the respective skip-gram model, generating a smoothed model by applying a variational inference operation over the machine learning data model, and identifying, based on the smoothed model and the corpus of electronic text, a change in a semantic use of a word over at least a portion of the window of time.

In another embodiment, a non-transitory computer readable medium stores instructions, which, when executed by a processor, performs an operation comprising deriving, based on a corpus of electronic text, a machine learning data model that associates words with corresponding usage contexts over a window of time, according to a diffusion process, wherein the machine learning data model comprises a plurality of skip-gram models, wherein each skip-gram model comprises a word embedding vector and a context embedding vector for a respective time step associated with the respective skip-gram model, generating a smoothed model by applying a variational inference operation over the machine learning data model, and identifying, based on the smoothed model and the corpus of electronic text, a change in a semantic use of a word over at least a portion of the window of time.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2 illustrates example graphical outputs generated based on dynamic word embeddings, according to one embodiment.

DETAILED DESCRIPTION

Embodiments disclosed herein provide techniques to track changes in language and word use over time. More specifically, embodiments disclosed herein leverage dynamic word embedding models to determine whether certain words have meanings that have changed over time. As described in greater detail herein, a user may submit a request to track the meaning of one or more words (e.g., a brand name, movie title, etc.) over time. Using the dynamic word embedding model, embodiments disclosed herein are able to detect whether the meaning of the requested words have changed, and alert the user to the change. Additionally and/or alternatively, the dynamic word embedding model may be used to generate and output a graphical representation of how the meaning of a requested word has changed over time.

Figure 1:
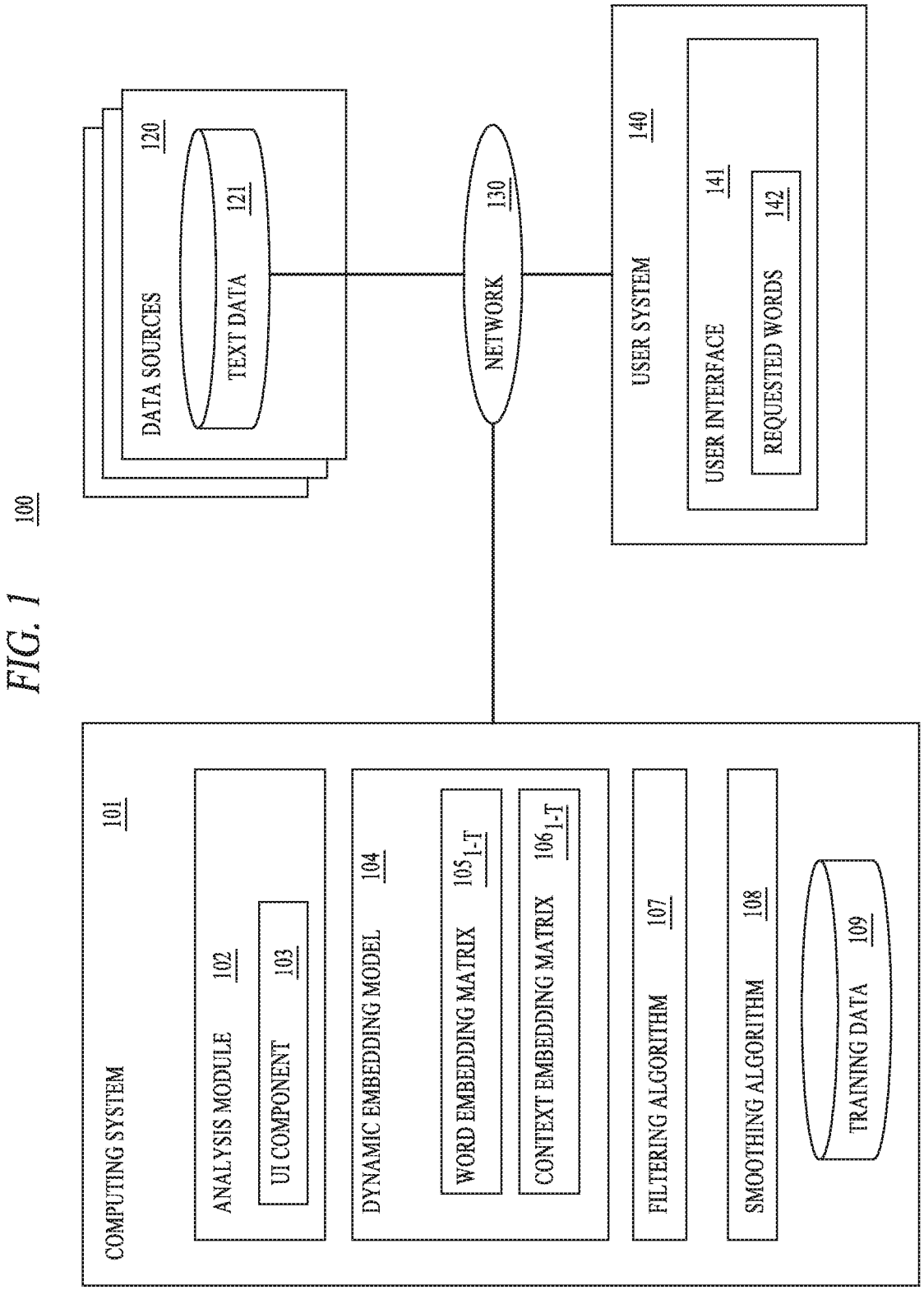
FIG. 1 illustrates a system which provides dynamic word embeddings, according to one embodiment.

FIG. 1 illustrates a system 100 which provides dynamic word embeddings, according to one embodiment. As shown, the system 100 includes one or more computing systems 101, one or more data sources 120, and a user system 140 connected via a network 130. The computing system 101 is representative of any type of computing system, such as a server, compute cluster, grid, workstation, and the like. The computing system 101 includes an analysis module 102, which is configured to track changes in language and word use over time using a dynamic embedding model 108. For example, the analysis module 102 may, for a requested word, generate a graphical representation of how the use or meaning of the word has changed over time. Additionally and/or alternatively, the analysis module 102 may track the meaning of the requested word over time, and alert the requesting user if a change in the meaning of the word has occurred.

The data sources 120 illustratively include a respective corpus of text data 121. The data sources 120 are representative of any type of data source of text data, such as social media platforms, digital libraries, newspapers, and the like. The text data 121 is representative of any type of electronic data that includes text, such as electronic books, electronic newspapers, social media publications, and the like. Each individual element of the text data 121 is associated with a respective timestamp reflecting an associated publication date (e.g., the date a book was published, the date a newspaper was published, the date a user published a message on a social media platform, etc.). Although the text data 121 may include any form or type of electronic text, electronic text documents are used as a non-limiting reference example herein for the sake of clarity.

A user of the user system 140 may specify one or more requested words 142 to the analysis module 102 via the user interface 141. For example, the user may request to view how the meaning of the requested words 142 of "peer" and "software" have changed over time. The analysis module 102 may generate the example output of FIG. 2 based on an analysis of the electronic documents in the text data 121 using the dynamic embedding model 104. As shown, FIG. 2 is a graphical user interface (GUI) 200 including a graph 201 for the requested word "peer" and a graph 202 for the requested word "software". The x-axis of the graphs 201, 202 correspond to different dates, while the y-axis corresponds to the cosine distance (or similarity) between the requested words 142 and a set of example terms. Generally, a higher cosine distance value reflects that the requested words 142 are more similar to the terms from the corpus.

As shown, graph 201 shows the similarities between the term "peer" and a plurality of different terms 210-219 in the electronic documents in the text data 121 (used as training data 109). For example, graph 201 reflects that around the year 1850, the word "peer" was most closely associated with the word "nobleman," while around the year 2000, "peer" was less closely related with "nobleman" and most closely related with the word "classroom". Therefore, the graph 201 reflects how the use of the word "peer" changed over time.

Similarly, graph 202 reflects the similarities between the term "software" and the terms 220-229. As shown, the graph 202 reflects that around the year 1850, "software" was most closely related to the term "processing", while around the year 2000, "software" was most closely related to the word "computer", which reflects the rise of the computer and the technological era. Additionally, graph 202 reflects that the term "web" was not closely related to "software" around the year 1850, but the terms experienced a significant increase in relationship shortly before the year 2000, which coincides with the proliferation of the World Wide Web. Therefore, more generally, the analysis module 102 may compare the cosine distance values for any given word over time to determine whether the meaning of the word has changed. Doing so allows the analysis module 102 to alert a requesting user that the meaning of a requested word 142 has changed.

Returning to FIG. 1, the computing system 101 further includes a dynamic embedding model 104, a filtering algorithm 107, a smoothing algorithm 108, and a data store of training data 109. The training data 109 is representative of text data 121 gathered from each of the plurality of data sources 120, and is used to train the dynamic embedding model 104. The dynamic embedding model 104 is a machine learning (ML) data model that learns a plurality of word embedding matrices $105_{1-T}$ and a plurality of context embedding matrices $106_{1-T}$. In doing so, the dynamic embedding model 104 is able to identify word embedding matrices $105_{1-T}$ that drift over time, indicating that the meaning or use of the word has changed over such time.

The dynamic embedding model 104 is composed of a list of the L most frequent words, called the vocabulary, and a plurality of pairs of word embedding matrices $105_{1-T}$ and context embedding matrices $106_{1-T}$. Each word embedding matrix contains a plurality of word embedding vectors, one word embedding vector for each word in the vocabulary. Similarly, each context embedding matrix contains a plurality of context embedding vectors, one context embedding vector for each word in the vocabulary. Each word embedding matrix $105_{1-T}$ and context embedding matrix $106_{1-T}$ pair is connected to allow the dynamic embedding model 104 determine how the meaning of words change over time. For example, if the vocabulary contains one million words, and the text in the text data 121 is divided into a plurality of time slices (also referred to as time steps, or time stamps), where each time slice corresponds to a given year of publication over a period of 100 years, the dynamic embedding model 104 would include 100 pairs of word embedding matrices $105_{1-100}$ and context embedding matrices $106_{1-100}$ comprising a total of 100 million word embedding vectors and 100 million context embedding vectors. Therefore, in such an example, a pair including word embedding matrix $105_1$ and context embedding matrix $106_1$ would correspond to the first time slice (e.g., the first publication year of text documents in the text data 121), and include data describing the usage of each word from the vocabulary in the documents that comprise the first time slice. Similarly, a pair including word embedding matrix $105_{10}$ and context embedding matrix $106_{10}$ would correspond to the tenth time slice (e.g., the tenth publication year of text in the text data 121, which need not be 10 sequential years relative to the first publication year), and include data describing the usage of each word from the vocabulary in the documents that comprise the tenth time slice.

The training data 109 is considered to include a plurality of T texts, where each text is a sequence of words from the vocabulary, and is associated with a respective time stamp (e.g., based on the year or date of publication of the associated documents from the data sources 120). The dynamic embedding model 104 learns the word embedding matrices $105_{1-T}$ and the context embedding matrices $106_{1,J}$, which include data describing each word in the vocabulary. Stated differently, for each word i in the vocabulary, the dynamic embedding model 104 learns a word embedding vector $u_{i,t}$ and a context embedding vector $v_{i,t}$, where $u_{i,t}$, $v_{i,t} \in \mathbb{R}^d$, where $\mathbb{R}$ is all real numbers and d is the embedding dimension. Collectively, for a given time slice t, the word embedding vectors $u_{i,t}$ for all words i in the vocabulary form a word embedding matrix $105_t$, where each column of the word embedding matrix corresponds to a word embedding vector. Similarly, for a given time slice t, the context embedding vectors $v_{i,t}$ for all words i in the vocabulary form a word embedding matrix $106_t$, where each column of the context embedding matrix corresponds to a context embedding vector.

Figure 3:
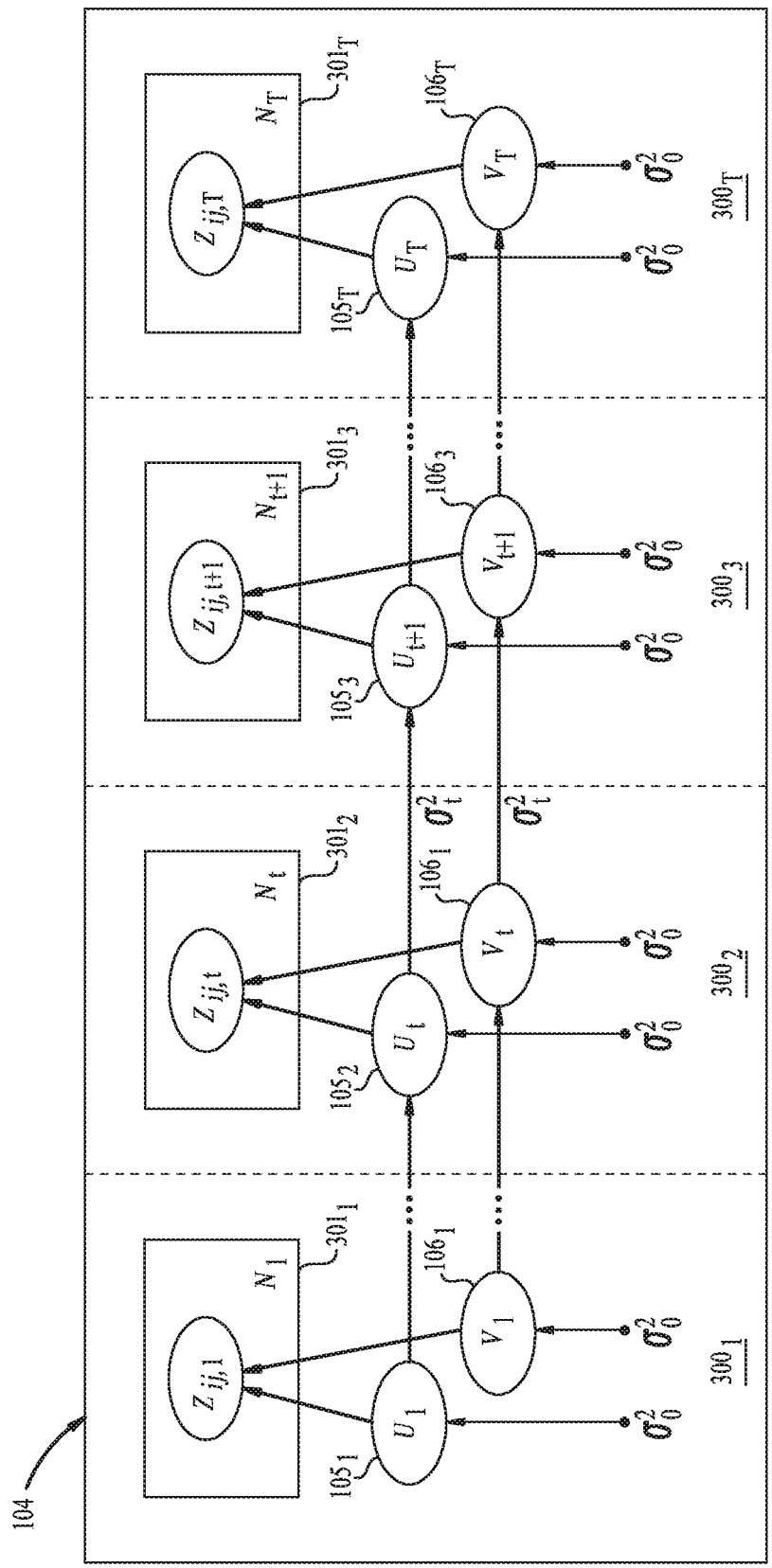
FIG. 3 illustrates components of an example dynamic word embedding model, according to various embodiments.

FIG. 3 is a graphical illustration of the components of an example dynamic word embedding model 104, according to various embodiments. As shown, the dynamic embedding model 104 includes a plurality of instances of a Bayesian skip-gram models $300_{1-T}$, where a given instance of the skip-gram model $300_{1-T}$ corresponds to a time slice of the text documents in the training data 109. For example, the skip-gram model $300_1$ may correspond to the first time slice (e.g., the first publication year), while the skip-gram model $300_T$ may correspond to the final time slice (e.g., the latest publication year).

Generally, each skip-gram model $300_{1-T}$ is a probabilistic model, which, for each pair of words i,j in the vocabulary of the training data 109, computes a respective probability $301_{1-T}$ that word i appears within the context of the word j within a predefined window of words (e.g., 4 word windows) in the documents in the training data 109. The skip-gram model $300_{1-T}$ computes the probabilities $301_{1-T}$ (denoted as $\sigma(u_{i,t}^T v_{j,t})$, where $u_{i,t}$, $v_{j,t}$ correspond to the word embedding vectors and context embedding vectors, respectively), using the sigmoid function $\sigma(x)=1/(1+e^{-x})$.

To learn each of the word embedding matrices $105_{1-T}$ and the context embedding matrices $106_{1-T}$ of the corresponding skip-gram model $300_{1-T}$, the analysis module 102 collects positive examples of word pairs in the training data 109, where a positive example reflects a pair of words that are in fact within a predefined context window of each other in a document of the training data 109. For a given time step t and pair of words i,j, the term $n_{ij,t}^+$ reflects the number of times the words appear within the predefined window in the training data 109. Therefore, when preprocessing the training data 109 to learn the matrices $105_{1-T}$, $106_{1-T}$, the analysis module 102 increments the count $n_{ij,t}^+$ each time a word-word pair is encountered to reflect that the words appear in context of each other. The analysis module 102 also creates a segment of the training data 109 that includes fictitious training set of rejected word-word pairs, also referred to as negative examples. The counts of negative examples may be expressed by the term $n_{ij,t}^-$, and reflect the counts of false (or incorrect) predictions. As such, in one embodiment, the analysis module 102 considers the total co-occurrence counts of both positive negative examples in the training data 109 using the following equation:

$$p(n_t^+, n_t^- | U_t, V_t) = \prod_{i,j=1}^L \sigma(u_{i,t}^T v_{j,t})^{n_{ij,t}^+} \sigma(-u_{i,t}^T v_{j,t})^{n_{ij,t}^-} \quad \text{equation (1)}$$

In equation 1, dropping the subscript indices i and j for $n_t^+$ and $n_t^-$ denotes the entire L×L matrices, where $U_t = (u_{1,t}, \ldots, u_{L,t}) \in \mathbb{R}^{d \times L}$ denotes a matrix $105_t$ of all word embedding vectors for a given skip-gram model $300_t$, and $V_t = (v_{1,t}, \ldots, v_{L,t}) \in \mathbb{R}^{d \times L}$ denotes a matrix $106_t$ of all context embedding vectors for a given skip-gram model $300_t$. In one embodiment, the analysis module 102 considers the combination of both positive and negative examples as $n_t^{\pm} = (n_t^-, n_t^-)$, and computes the combined log-likelihood using the following equation:

$$\log p(n_t^{\pm} | U_t, V_t) = \sum_{i,j=1}^L (n_{ij,t}^+ \log \sigma(u_{i,t}^T v_{j,t}) + n_{ij,t}^- \log \sigma(-u_{i,t}^T v_{j,t})) \quad \text{equation (2)}$$

The dynamic embedding model 104 applies a Kalman filter as a prior for the time evolution of the embedding vectors that allows information to be shared between two or more instances of the skip-gram models $300_{1-T}$ while still allowing the vectors to drift. Considering the training data 109 as a corpus of T documents written at time steps (or time stamps) $\tau_1 < \ldots < \tau_T$, the dynamic embedding model 104 generates statistics of word-context pairs in the matrices $n_t^+, n_t^-$ of positive and negative word counts (e.g., co-occurrence counts), respectively, with matrix elements $n_{ij,t}^+$, $n_{ij,t}^-$ respectively, for a given pair of words i,j. Therefore, for the dynamic embedding model 104, $U_t = (u_{1,t}, \ldots, u_{L,t}) \in \mathbb{R}^{d \times L}$ is the matrix 105 of dynamic word embedding vectors at time t, and the matrix $V_t = (v_{1,t}, \ldots, v_{L,t}) \in \mathbb{R}^{d \times L}$ is the matrix 106 of context embedding vectors at time t.

To build the dynamic embedding model 104, the analysis module 102 applies a diffusion process of the embedding vectors over time. In one embodiment, the analysis module 102 defines the variance $\sigma_t^2$ of the transition kernel for the diffusion process by the following equation:

$$\sigma_t^2 = D(\tau_{t+1} - \tau_t) \quad \text{equation (3)}$$

In equation 3, D is a global diffusion constant and $(\tau_{t+1} - \tau_t)$ is the time between time steps. Furthermore, at each time step t, the analysis module 102 adds an additional Gaussian prior with zero mean and zero variance $\sigma_0^2$ to prevent the embedding matrices 105, 106 from growing too large. This corresponds to the analysis module 102 performing the following operation at each time step t:

$$p(U_{t+1}|U_t) \propto N(U_t, \sigma_t^2) N(0, \sigma_0^2) \quad \text{equation (4)}$$

The analysis module 102 then computes a normalization for equation 4, and applies an Ornstein-Uhlenbeck process. At time step t=1, the analysis module 102 defines the prior probability $p(U_1|U_0) \equiv N(0, \sigma_0^2 I)$ over the word embedding matrix $105_1$, and similarly for the context embedding matrix $106_1$, the prior probability is defined as $p(V_1|V_0) \equiv N(0, \sigma_0^2 I)$. The analysis module 102 then determines the joint distribution according to the following equation:

$$p(n^{\pm}, U, V) = \quad \text{equation (5)}$$

$$\prod_{t=0}^{T-1} p(U_{t+1} | U_t) p(V_{t+1} | V_t) \times \prod_{t=1}^T \prod_{i,j=1}^L p(n_{ij,t}^{\pm} | u_{i,t}, v_{j,t})$$

Once the dynamic embedding model 104 is built, the analysis module 102 may perform inference, i.e., the analysis module 102 may find a posterior probability distribution over word embedding matrices $105_{1-T}$ and context embedding matrices $106_{1-T}$ that explain the word co-occurrences in the training data 109. The analysis module 102 may learn these probabilities using one or more different algorithms, including the filtering algorithm 107 and/or the smoothing algorithm 108. The filtering algorithm 107, discussed in greater detail with reference to FIG. 6, may be used in streaming data implementations, where new training data 109 is received (e.g., as new text data 121 is published via the data sources 120). As such, the filtering algorithm 107 trains the model 104 on past, and not on future observations. The smoothing algorithm 108, described in greater detail with reference to FIG. 7, is applied to the entire corpus of training data 109 and is based on both future and past observations. The smoothing algorithm 108 may therefore provide smoother trajectories and more accurate refinement of the parameters of the model 104.

Furthermore, once the dynamic embedding model 104 is built the analysis module 102 may refine the parameters of the model 104, including the co-occurrence probabilities $301_{1-T}$ for each word pair in the corpus. The analysis module 102 may learn these probabilities $301_{1-T}$ using one or more different algorithms, including the filtering algorithm 107 and/or the smoothing algorithm 108. The filtering algorithm 107, discussed in greater detail with reference to FIG. 6, may be used in streaming data implementations, where new training data 109 is received (e.g., as new text data 121 is published via the data sources 120). As such, the filtering algorithm 107 trains the model 104 on past, and not on future observations. The smoothing algorithm 108, described in greater detail with reference to FIG. 7, is applied to the entire corpus of training data 109 and is based on both future and past observations. The smoothing algorithm 108 may therefore provide smoother trajectories and more accurate refinement of the parameters of the model 104.

Figure 4:
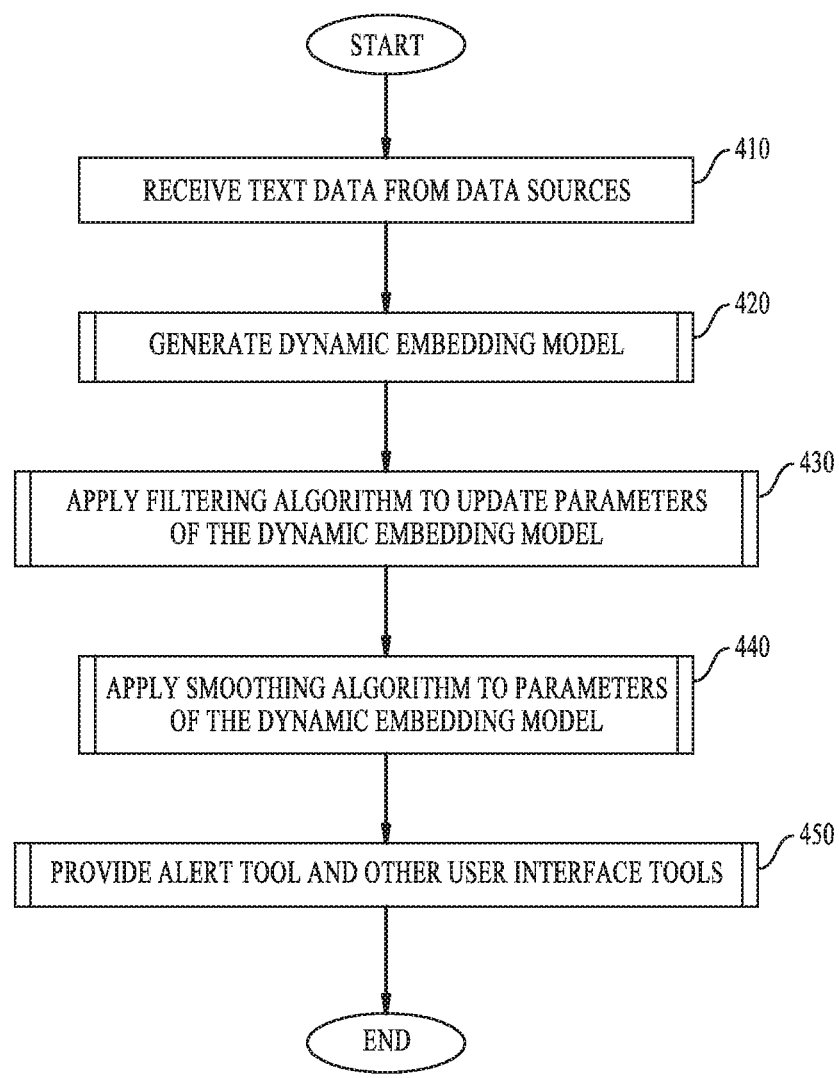
FIG. 4 is a flow chart illustrating a method to provide dynamic word embeddings, according to one embodiment.

FIG. 4 is a flow chart illustrating a method 400 to provide dynamic word embeddings, according to one embodiment. As shown, the method 400 begins at block 410, where the analysis module 102 receives text data 121 from the data sources 120. As previously stated, the text data 121 may include any form or type of text data, including, without limitation, electronic books, journals, and newspapers, social media posts and/or publications, and the like. Each item of text data (e.g., a document, social media publication, etc.) is associated with a respective publication date. The analysis module 102 may then store the received data as the training data 109. At block 420, described in greater detail with reference to FIG. 5, the analysis module 102 orchestrates the generation of the dynamic embedding model 104. Generally, the dynamic embedding model 104 includes a plurality of Bayesian skip-gram models $300_{1-T}$, where each skip-gram model $300_{1-T}$ is associated with a respective time step. The time steps may correspond to any unit of time, such as a week, a month, a year, a decade, etc. The dynamic embedding model 104 is a model of the word co-occurrences in the training data 109. Each skip-gram model $300_{1-T}$ is connected to at least one other skip-gram model $300_{1-T}$, which allows the dynamic embedding model 104 to smooth the matrices $105_{1-T}$, $106_{1-T}$ in each skip-gram model $300_{1-T}$ based on the drift of the matrices $105_{1-T}$, $106_{1-T}$ over time.

At block 430, described in greater detail with reference to FIG. 6, the analysis module 102 optionally applies the filtering algorithm 107 to update parameters of the dynamic embedding model 104. Generally, the filtering algorithm 107 is applied to new text received from the data sources 120 (e.g., periodically as new documents are published). The filtering algorithm 107 processes the new data using the dynamic embedding model 104 to refine the matrices $105_{1-T}$, $106_{1-T}$, and any other parameters of the dynamic embedding model 104, such as uncertainty and correlations between different time steps. At block 440, described in greater detail with reference to FIG. 7, the analysis module 102 optionally applies the smoothing algorithm 108 to update parameters (e.g., uncertainty, correlation, and the matrices $105_{1-T}$, $106_{1-T}$) of the dynamic embedding model 104. The smoothing algorithm 108 considers correlations between all time steps to parameterize the variational distribution in a way that only requires a few parameters, while still capturing realistic correlations in time. More specifically, the smoothing algorithm 108 leverages a multivariate normal distribution with a tridiagonal precision matrix.

At block 450, the analysis module 102 provides the UI component 103, through which a user may submit one or more requested words 142. The analysis module 102 may then provide an alert tool that alerts the user if the meaning of the requested words 142 changes over time. The analysis module 102 may also return a GUI similar to the GUI depicted in FIG. 2, which allows the user to view how the meaning of the requested words 142 has changed over time.

Figure 5:
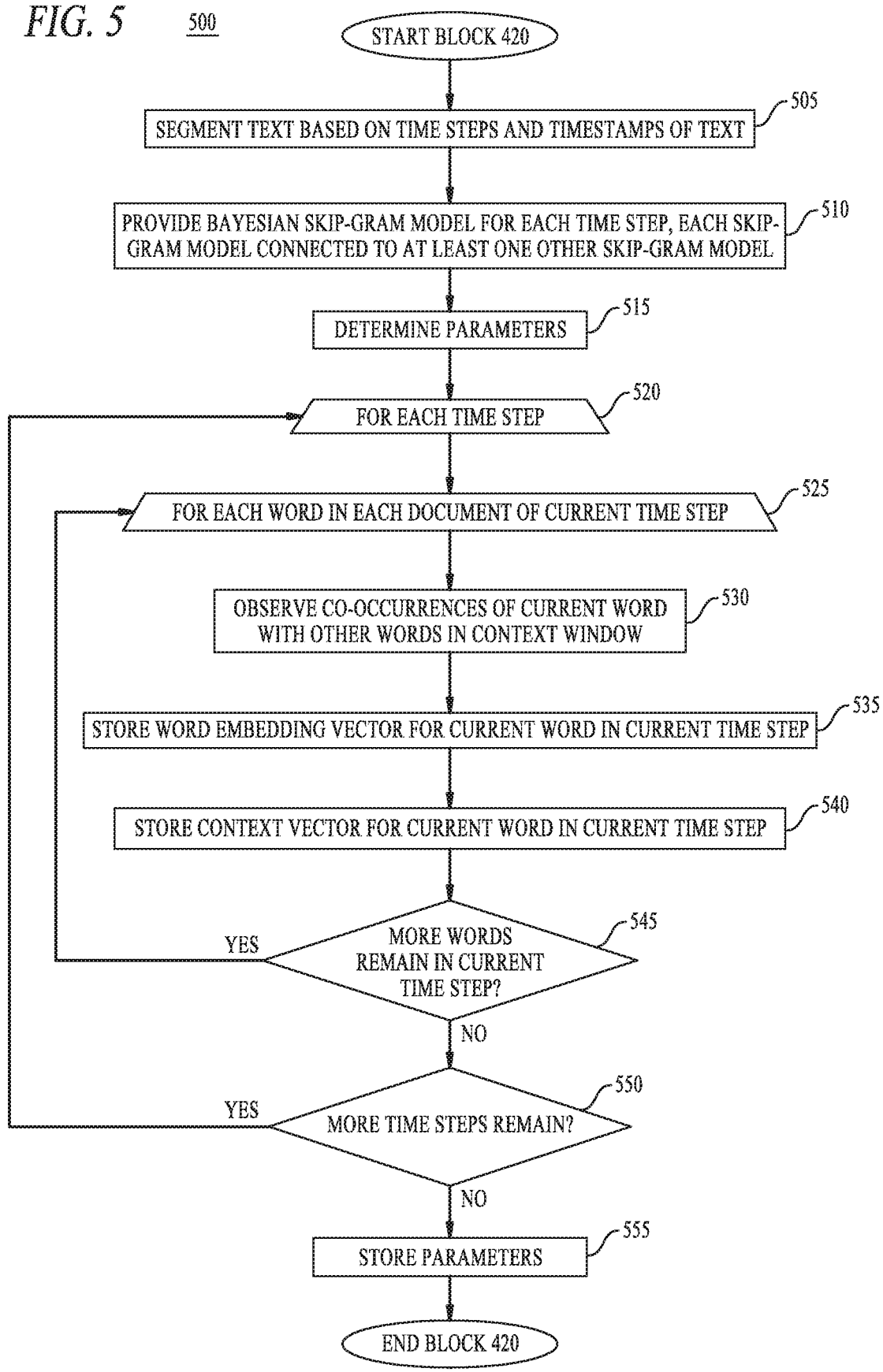
FIG. 5 is a flow chart illustrating a method to train a dynamic word embedding model, according to one embodiment.

FIG. 5 is a flow chart illustrating a method 500 to train a dynamic word embedding model, according to one embodiment. As shown, the method 500 begins at block 505, where the analysis module 102 segments the text documents in the training data 109 based on one or more defined time steps and the timestamps reflecting when each document was published. For example, if the time steps are defined by years, each document published in a given year is segmented into the same time step (e.g., all documents published from Jan. 1, 1980-Dec. 31, 1980 are associated with the time step corresponding to the year 1980). At block 510, a dynamic embedding model 104 is provided, the dynamic embedding model 104 comprising a plurality of Bayesian skip-gram models $300_{1-T}$. Each skip-gram model $300_{1-T}$ is provided for a given time step, and where each skip-gram model $300_{1-T}$ is connected to the skip-gram model $300_{1-T}$ of at least one other time step.

At block 515, the analysis module 102 determines any relevant parameters, such as context window size, hyperparameters for the dynamic embedding model. The hyperparameters may include the vocabulary size, batch size for the smoothing algorithm 108, embedding dimensions, training steps for each time step in the filtering algorithm 107, numbers of pretraining steps with and without minibatch sampling for the smoothing algorithm 108, a context window size for positive examples, a ratio of negative to positive examples, a context exponent for negative examples, diffusion constants, variance of overall priors, a learning rate for the filtering algorithm 107, a learning rate during minibatch sampling of the smoothing algorithm 108, a learning rate after the minibatch sampling of the smoothing algorithm 108, one or more decay rates for moment estimates, and a value for a regularizer of an Adam optimizer.

At block 520, the analysis module 102 executes a loop including blocks 525-550 for each time step. At block 525, the analysis module 102 executes a loop including blocks 530-340 for each word in each document of the current time step (e.g., each word in the vocabulary of the current time step. At block 530, the analysis module 102 observes the co-occurrences of the current word with other words in the context window of the associated document. Doing so allows the analysis module 102 to construct the matrices $n_t^+, n_t^-$. In at least one embodiment, the analysis module 102 stochastically samples a context window size uniformly in an interval $[1, \ldots, c_{max}]$, where $c_{max}$ is the context window size for positive examples. Doing so allows the context size to shift (e.g. from 1, 2, 3, and 4 where $c_{max}$=4). As such, nearby words appear more often in the same context than words that are far apart from each other in a given sentence.

However, in one embodiment, for each pair of words ($w_1$, $w_2$) the analysis module 102 increases the counts $n_{i_{w1}, j_{w2}}^+$ by a value corresponding to $$\max\left(0, 1 - \frac{k}{c_{max}}\right),$$

where $0 \leq k \leq c_{max}$ is the number of words that appear between the words $w_1$, $w_2$, and $i_{w1}$, $j_{w1}$ correspond to unique index values of the words. To construct the negative count matrix $n_t^-$, the analysis module 102 draws negative samples (i,j) for each positive sample (i,j') by drawing a predefined ratio of negative to positive samples from a distribution defined by the following equation:

$$P'_t(j) = (P_t(j))^\gamma \bigg/ \left(\sum_{j'=1}^{L} (P_t(j'))^\gamma\right) \quad \text{equation (6)}$$

Where $\gamma$ is the context exponent for negative examples, L is the vocabulary size, and $P_t(j)$ is the empirical frequency of word j in the document of the current time step. Therefore, the analysis module 102 defines the negative examples as:

$$n_{ij,t}^- = \left(\sum_{i',j'=1}^{L} \left(n_{i',j',t}^+\right)\right) \eta P_t(i) P'_t(j) \quad \text{equation (7)}$$

Where $\eta$ is the ratio of negative to positive examples. At block 535, the analysis module 102 generates and stores the word embedding matrix $105_{1-T}$ for the current word based on the positive and negative word counts observed at block 530. At block 540, the analysis module 102 generates and stores the context embedding matrix $106_{1-T}$ for the current word based on the positive and negative word counts observed at block 530. At block 545, the analysis module 102 determines whether more words remain. If more words remain in the current time step, the method returns to block 525. Otherwise, the method proceeds to block 550, where the analysis module 102 determines whether more time steps remain. If more time steps remain, the method returns to block 520. Otherwise, the analysis module 102 proceeds to block 555, where parameters describing the dynamic embedding model 104 are stored. The parameters can include, for example, uncertainty values, the vectors, and correlations between different time steps. The parameters may include observed and unobserved parameters.

Figure 6:
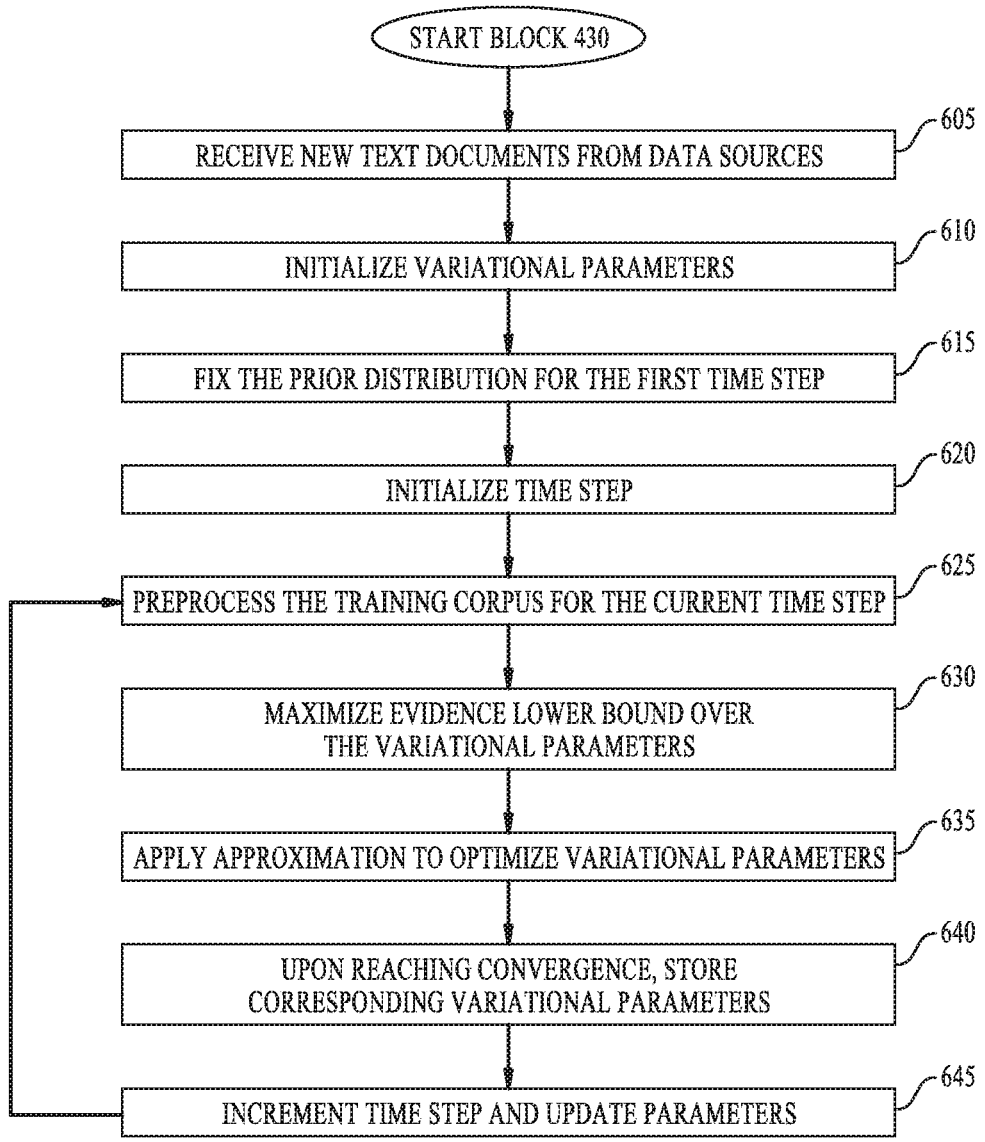
FIG. 6 is a flow chart illustrating a method to apply a filtering algorithm, according to one embodiment.
Figure 7:
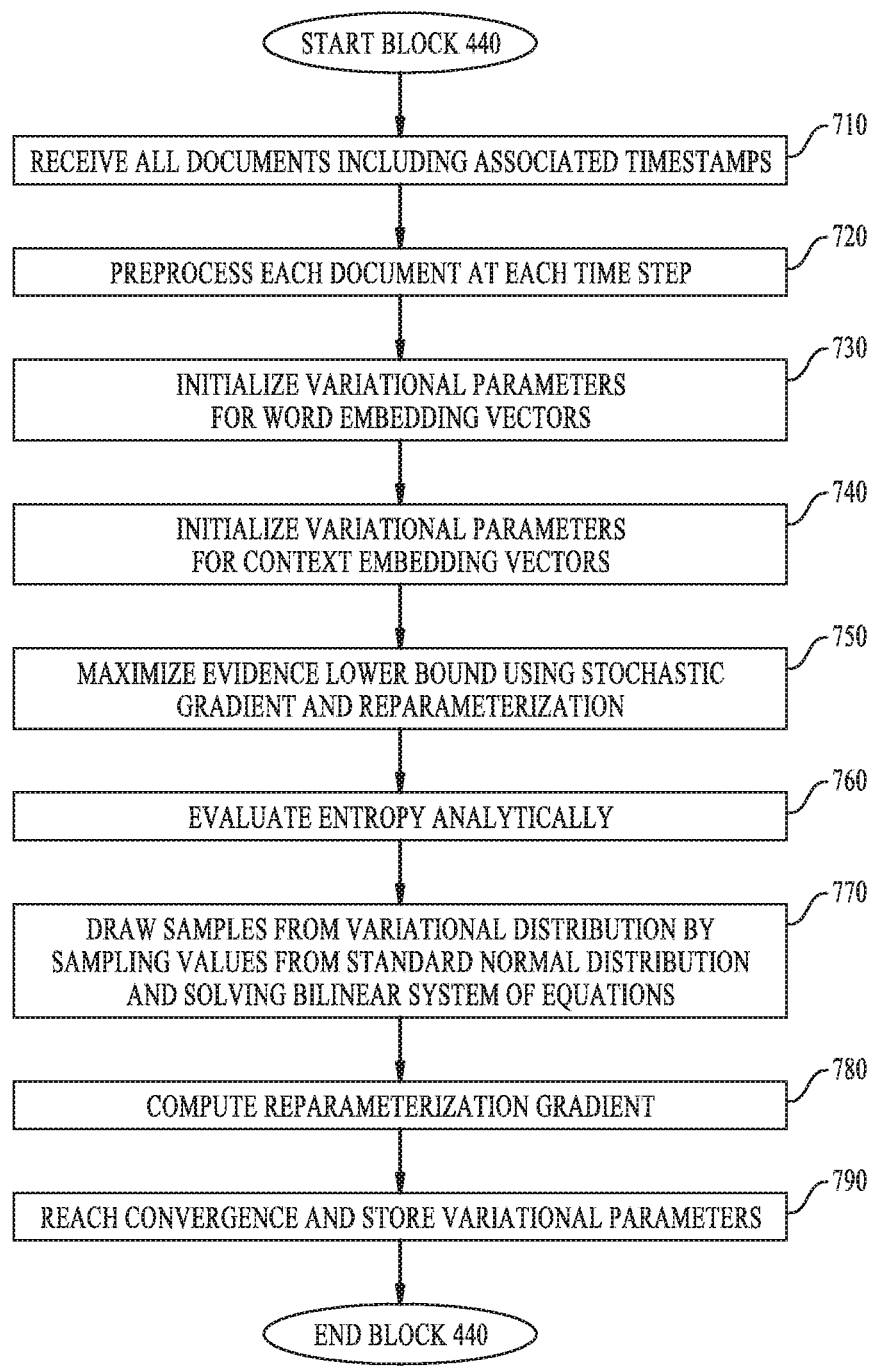
FIG. 7 is a flow chart illustrating a method to apply a smoothing algorithm, according to one embodiment.

FIG. 6 is a flow chart illustrating a method 600 corresponding to block 430 to apply the filtering algorithm 107 to update parameters of the dynamic embedding model 104, according to one embodiment. Generally, the training corpus 109 is observed sequentially in the form of a sequence of chunks (e.g., documents) of text that are received periodically (e.g., weekly, monthly) from the data sources 120. The method 600 learns trajectories for word embeddings by continuously updating beliefs about the embeddings as new documents are received from the data sources. The method 600 combines the new data with previously accumulated information (e.g., when the dynamic embedding model 104 was originally built, or from previous iterations of the method 600) to refine the uncertainty of word embeddings for each word.

As shown, the method 600 begins at block 605, where the analysis module 102 receives new electronic text documents from the text data 121 of the data sources 120, which is stored in the training data 109. As previously stated, each electronic text document is associated with a respective timestamp (e.g., a publication date). The granularity of the timestamp may correspond to how the time slices are defined (e.g., months, years, decades, etc.). At block 610, the analysis module 102 initializes the variational parameters in the following equation:

$$q(U_t, V_t) = \prod_{i=1}^{L} N\left(u_{i,t}; u_{ui,t}, \sum_{ui,t}\right) N\left(v_{i,t}; \mu_{vi,t}, \sum_{vi,t}\right) \quad \text{equation (8)}$$

In one embodiment, the analysis module 102 initializes the variational parameters by setting all components of $\mu$ to zero, and setting all diagonal elements of $\Sigma$ to $\sigma_0^2$. At block 615, the analysis module 102 fixes the prior distribution for the first time step by setting all components of $\tilde{\mu}$ to zero, and all diagonal elements of $\tilde{\Sigma}$ to $\sigma_0^2$. At block 620, the analysis module 102 initializes the time step t with a value of 1. At block 625, the analysis module 102 preprocesses the documents in the training corpus 109 that have a timestamp corresponding to the current time step. To do so, the analysis module 102 creates a matrix $n_t^+$, which is a sparse matrix of vocabulary size x vocabulary size. The elements of the matrix are co-occurrence counts of words within a certain context window (e.g., 4 word windows in the text of each document).

At block 630, the analysis module 102 maximizes the evidence lower bound $L_t$ over the components of $\mu$ and the diagonal elements of $\Sigma_{ui,t}, \Sigma_{vi,t}$ from equation 8. The evidence lower bound is defined by the following equation:

$$L_t = E[\log p(n_t^+|U_t V_t) + E[\log p(U_t V_t|n_{1:t-1}^+)] - E[\log q(U_t V_t)] \quad \text{equation (9)}$$

At block 635, the analysis module 102 optimizes the variational parameters from equation 8 using the following approximation:

$$p(U_t, V_t | n_{1:t-1}^\pm) \approx \prod_{i=1}^{L} N\left(u_{i,t}; \tilde{\mu}_{ui,t}, \tilde{\sum}_{ui,t}\right) N\left(v_{i,t}; \tilde{\mu}_{vi,t}, \tilde{\sum}_{vi,t}\right) \quad \text{equation (10)}$$

Equation 9 is maximized by stochastic gradient descent with a reparameterization technique. At block 640, the optimization converges, and the analysis module 102 stores the values of the variational parameters $\mu_{ui,t}, \mu_{vi,t}, \Sigma_{ui,t}$, and $\Sigma_{vi,t}$, where the vectors $\mu_{ui,t}$ and $\mu_{vi,t}$ are the fitted word embeddings and context embeddings, respectively, for the current time step, and the diagonals of the matrices $\Sigma_{ui,t}, \Sigma_{vi,t}$ measure the uncertainties associated with the word and context embeddings, respectively. At block 645, the analysis module 102 waits until a new set of training data is received from the data sources (e.g., when a week, month, or year has passed). The analysis module 102 then increments the time step t by one, and updates according to the following equation:

$$\tilde{\mu}_{ui,t} = \tilde{\Sigma}_{ui,t}(\tilde{\Sigma}_{ui,t-1} + \sigma_t^2 I)^{-1}\tilde{\mu}_{ui,t-1} \quad \text{equation 11}$$

The analysis module 102 updates $\tilde{\Sigma}$ according to the following equation:

$$\tilde{\sum}_{ui,t} = \left[\left[\tilde{\sum}_{ui,t-1}+\sigma_t^2 I\right]^{-1}+\left(\frac{1}{\sigma_0^2}\right)I\right]^{-1} \qquad \text{equation 12}$$

The analysis module then returns to block 625 to process the data for the latest time step.

FIG. 7 is a flow chart illustrating a method 700 corresponding to block 440 to apply the smoothing algorithm 108 to update parameters of the dynamic embedding model 104, according to one embodiment. Generally, in the method 700, the analysis module 102 leverages the entire corpus of training data 109, which consists of all documents from the text data 121 of all data sources 120. The analysis module 102 segments the documents in the training data 109 into different time steps based on the time stamp of each document (e.g., when the document was first published). By implementing the steps of the method 700, the analysis module 102 determines trajectories for word embeddings end-to-end (e.g., from the earliest dates of publication to the most recent dates of publication). Advantageously, the method 700 allows the analysis module 102 to consider all time steps while remaining efficient. By leveraging a multivariate normal distribution with a tridiagonal precision matrix, the method 700 parameterizes the variational distribution in a way that only requires a few parameters while still being able to capture realistic correlations in time.

As shown, the method 700 begins at block 710, where the analysis module 102 receives the corpus of training data 109, which includes all documents from the text data 121 from each data source 120. At block 720, the analysis module 102 preprocesses each document at each time step. Generally, to preprocess each document, the analysis module 102 creates a positive count matrix $n_t^+$ for each time step. The positive count matrix $n_t^+$ for each time step reflects, for each pair of words ($w_1$, $w_2$) in a given sentence (or other predefined window of words), how frequently the pair of words occurs within the predefined window across the time step. The analysis module 102 applies a deterministic scheme in building the positive count matrix $n_t^+$. Generally, for each pair of words ($w_1$, $w_2$) the analysis module 102 increases the counts $n_{i_{w1},j_{w2}}^+$ by a value corresponding to $$\max\left(0, 1-\frac{k}{c_{max}}\right),$$

where $0 \le k \le c_{max}$ is the number of words that appear between the words $w_1$, $w_2$, and $i_{w1}$, $j_{w1}$ correspond to unique index values of the words, respectively (where all words in the training data 109 are assigned a unique index value).

At block 730, the analysis module 102 initializes the variational parameters for the word embedding vectors. Generally, for each word i in the vocabulary (e.g., each word that appears at least once in the training data 109) and each dimension k of the word embedding vectors, the variational distribution for the word embedding vectors is defined by the following equation:

$$q(u_{1:T})=N(\mu_{u,1:T}, (B_u^T B_u)^{-1}) \qquad \text{equation (13)}$$

In equation 13, $\mu_u$ is a vector over the T time steps, and is initialized to zero. Furthermore, $B_u$ is a bidiagonal matrix T×T matrix defined by:

$$B_u = \begin{pmatrix} v_{u,1}\omega_{u,1} & & & & \\ & v_{u,2}\omega_{u,2} & & & \\ & & \ddots & \ddots & \\ & & & v_{u,T-1}\omega_{u,T-1} & \\ & & & & v_{u,T}\omega_{u,T} \end{pmatrix}$$

As shown, only non-zero values are stored in the matrix $B_u$. Furthermore, the analysis module 102 initializes $B_u$ such that $B^T B$ is the prior precision matrix Π which has the following non-zero elements:

$$\Pi_{11} = \sigma_0^{-2} + \sigma_1^{-2}$$

$$\Pi_{TT} = \sigma_0^{-2} + \sigma_{T-1}^{-2}$$

$$\Pi_{tt} = \sigma_0^{-2} + \sigma_{t-1}^{-2} + \sigma_t^{-2} \forall t \in \{2, \ldots, T-1\}$$

$$\Pi_{t,t+1} = \Pi_{t+1,t} = -\sigma_t^{-2}$$

At block 740, the analysis module 102 initializes the variational parameters for the context embedding vectors. Generally, for each word i in the vocabulary and each dimension k of the context embedding vectors, the variational distribution for the context embedding vectors is defined by the following equation:

$$q(v_{1:T})=N(\mu_{v,1:T}, (B_v^T B_v)^{-1}) \qquad \text{equation (14)}$$

In equation 14, $\mu_v$ is a vector over the T time steps, and is initialized to zero. Furthermore, $B_v$ is a bidiagonal matrix T×T matrix defined by:

$$B_v = \begin{pmatrix} v_{v,1}\omega_{v,1} & & & & \\ & v_{v,2}\omega_{v,2} & & & \\ & & \ddots & \ddots & \\ & & & v_{v,T-1}\omega_{v,T-1} & \\ & & & & v_{v,T}\omega_{v,T} \end{pmatrix}$$

As shown, only non-zero values are stored in the matrix $B_v$. Furthermore, the analysis module 102 initializes $B_v$ such that $B^T B$ is the prior precision matrix Π which has the following non-zero elements:

$$\Pi_{11} = \sigma_0^{-2} + \sigma_1^{-2}$$

$$\Pi_{TT} = \sigma_0^{-2} + \sigma_{T-1}^{-2}$$

$$\Pi_{tt} = \sigma_0^{-2} + \sigma_{t-1}^{-2} + \sigma_t^{-2} \forall t \in \{2, \ldots, T-1\}$$

$$\Pi_{t,t+1} = \Pi_{t+1,t} = -\sigma_t^{-2}$$

At block 750, the analysis module 102 maximizes the evidence lower bound defined by the following equation:

$$L(\lambda) = E_{q\lambda}[\log p(n^{\pm}, U, V)] - E_{a\lambda}[\log q_\lambda(U, V)] \qquad \text{equation (15)}$$

At block 760, the analysis module 102 evaluates the entropy portion $E_{q\lambda}[\log q_\lambda(U,V)]$ of equations 14 and 15 using the following equations:

$$-E_{q\lambda}[\log q_\lambda(u_{1:T})] = -\sum_t \log(v_{u,t}) + \text{constant} \qquad \text{equation (16)}$$

$$-E_{q\lambda}[\log q_\lambda(v_{1:T})] = -\sum_t \log(v_{v,t}) + \text{constant} \qquad \text{equation (17)}$$

At block 770, the analysis module 102 draws samples from the variational distribution qusing sampling values E from the standard normal distribution, and solving a bilinear system of equations. For example, for a single dimension $u_{1:T}$ of the word embedding vector (and analogously for the dimension $v_{1:T}$ of the context embedding vector, at block 770, the analysis module 102 draws S independent samples $u_{1:T}^{[s]}$ with $s \in \{1, \ldots, S\}$ from $q(u_{1:T})$ by parameterizing:

$$u_{1:T}^{[s]} = \mu_{u,1:T} + x_{u,1:T}^{[s]}$$

With:

$$x_{u,1:T}^{[s]} = B_u^{-1} \epsilon_{u,1:T}^{[s]}, \text{ where } \epsilon_{u,1:T}^{[s]} \sim N(0,I) \quad \text{equation (18)}$$

Again, the analysis module 102 performs an analogous reparameterization of equation 18 for the context embedding vector. At block 780, the analysis module 102 computes the reparameterization gradient using the fact that the derivative of the inverse of a matrix can be expressed in terms of the derivative of the matrix itself. In one embodiment, the analysis module 102 uses the following relationship to determine the derivative of the entropy:

$$\frac{\partial B_u^{-1}}{\partial v_t} = -B_u^{-1} \frac{\partial B_u}{\partial v_t} B_u^{-1} \quad \text{equation (19)}$$

At block 790, the analysis module 102 reaches convergence and stores the values for the variational parameters to a storage location. The variational parameters $\mu_u$ and $\mu_v$ are the most probable word embedding trajectories, and the matrices $B_u$ and $B_v$ parameterize the uncertainty and correlations between different time steps.

Figure 8:
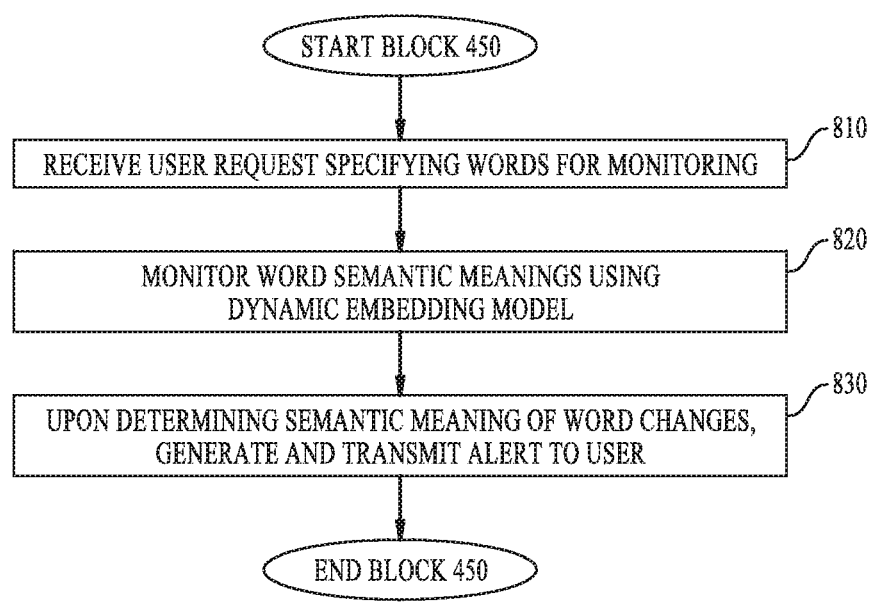
FIG. 8 is a flow chart illustrating a method to provide an alert tool, according to one embodiment.

FIG. 8 is a flow chart illustrating a method 800 to provide an alert tool, according to one embodiment. As shown, the method 800 begins at block 810, where a user specifies one or more requested words 142 via the user interface 141. The analysis module 102 then receives the requested words 142 via the UI component 103, and stores an indication to monitor the requested words 142. At block 820, the analysis module 102 monitors the semantic meanings of the requested words 142 using the dynamic embedding model 104. Generally, the analysis module 102 may consider the most closely related words to the requested words 142 over different time steps (e.g., each month, each year, etc.) using the dynamic embedding model 104. Doing so allows the analysis module 102 to determine the most closely related words to the requested words 142, and whether these relations change over time. At block 830, the analysis module 102 determines that the semantic meaning of at least one of the requested words 142 has changed. In response, the analysis module 102 generates and transmits an alert specifying an indication of the change to the requesting user. For example, if the requested word(s) 142 include the title of a movie, book, or television show, the analysis module 102 monitors the title over time. If the meaning of the title changes over time, the analysis module 102 may alert the associated user. Doing so allows the user to determine when favorable or unfavorable changes in the meaning of the title occur.

Figure 9:
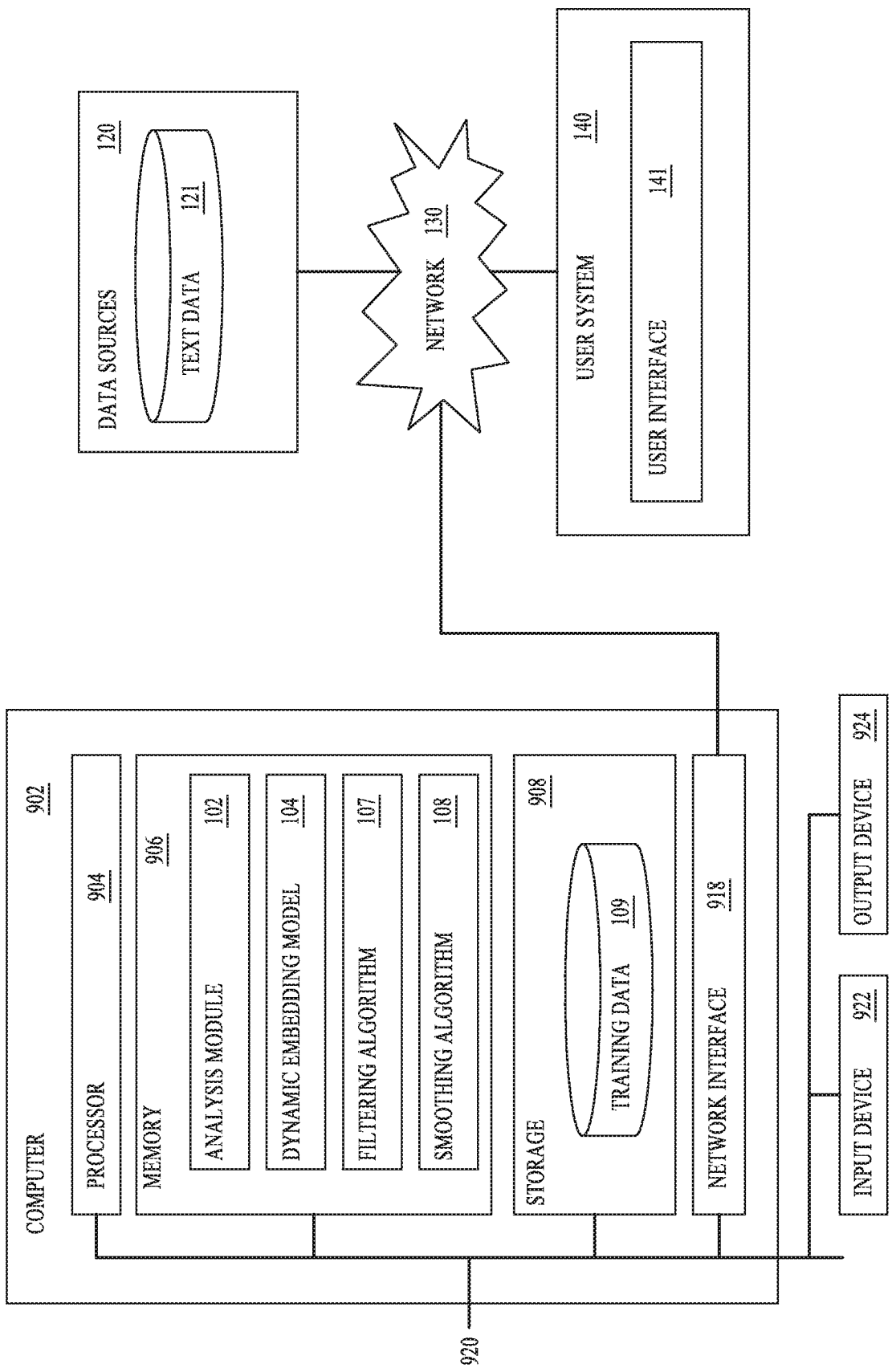
FIG. 9 illustrates a system which provides dynamic word embeddings, according to one embodiment.

FIG. 9 illustrates a system 900 which provides dynamic word embeddings, according to one embodiment. The networked system 900 includes the computing system 101. The computing system 101 may also be connected to other computers via a network 130. In general, the network 130 may be a telecommunications network and/or a wide area network (WAN). In a particular embodiment, the network 130 is the Internet.

The computing system 101 generally includes a processor 904 which obtains instructions and data via a bus 920 from a memory 906 and/or a storage 908. The computing system 101 may also include one or more network interface devices 918, input devices 922, and output devices 924 connected to the bus 920. The computing system 101 is generally under the control of an operating system (not shown). Any operating system supporting the functions disclosed herein may be used. The processor 904 is a programmable logic device that performs instruction, logic, and mathematical processing, and may be representative of one or more CPUs. The network interface device 918 may be any type of network communications device allowing the computing system 101 to communicate with other computers via the network 130.

The storage 908 is representative of hard-disk drives, solid state drives, flash memory devices, optical media and the like. Generally, the storage 908 stores application programs and data for use by the computing system 101. In addition, the memory 906 and the storage 908 may be considered to include memory physically located elsewhere; for example, on another computer coupled to the computing system 101 via the bus 920.

The input device 922 may be any device for providing input to the computing system 101. For example, a keyboard and/or a mouse may be used. The input device 922 represents a wide variety of input devices, including keyboards, mice, controllers, and so on. Furthermore, the input device 922 may include a set of buttons, switches or other physical device mechanisms for controlling the computing system 101. The output device 924 may include output devices such as monitors, touch screen displays, and so on.

As shown, the memory 906 contains the analysis module 102, the dynamic embedding model 104, the filtering algorithm 107, and the smoothing algorithm 108, each described in greater detail above. As shown, the storage 908 contains the training data 109 of text data 121 received from the data sources 120, each described in greater detail above. Generally, the system 900 is configured to implement all systems, methods, algorithms, and functionality described above with reference to FIGS. 1-8.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    deriving, based on a corpus of electronic text, a machine learning data model that associates words with corresponding usage contexts over a window of time, wherein the machine learning data model comprises a plurality of skip-gram models, wherein each skip-gram model comprises a word embedding vector and a context embedding vector for a respective time step associated with the respective skip-gram model, wherein deriving the machine learning data model comprises applying a diffusion process to the word embedding vectors and the context embedding vectors of the plurality of skip-gram models such that the word embedding vectors and the context embedding vectors are aligned to a common frame of reference of time;

generating a smoothed model by applying a variational inference operation; and identifying, based on the smoothed model and the corpus of electronic text, a change in a semantic use of a word over at least a portion of the window of time.

2. The method of claim 1, further comprising:

prior to identifying the change in the semantic use of the word, receiving a request to monitor the semantic use of the word;

monitoring the semantic use of the word based on the smoothed model and new text added to the corpus of electronic text;

identifying the change in the semantic use of the word based on at least one of: (i) a distance between two of the word embedding vectors, or (ii) a distance between two of the context embedding vectors;

generating an indication of the change in the semantic use of the word; and outputting the indication.

3. The method of claim 1, wherein the word embedding vectors comprise word embeddings for each word in the corpus of electronic text, wherein the context embedding vectors comprise context embeddings for each word in the corpus of electronic text, wherein the method further comprises segmenting each text element in the corpus of electronic text into a respective time step of a plurality of time steps based on a respective timestamp of each text element, wherein the plurality of time steps comprises each time step associated with the plurality of skip-gram models.

4. The method of claim 1, wherein the corpus of electronic text includes a plurality of pairs of words, wherein deriving the machine learning data model further comprises: generating a positive count matrix, wherein the positive count matrix specifies, for each of the plurality of pairs of words in the corpus of electronic text, a respective count of observed occurrences of each respective pair of words within a predefined window of words in a text element of each time step.

5. The method of claim 1, wherein deriving the machine learning data model further comprises: generating a negative count matrix based on a plurality of rejected pairs of words in a second training corpus of electronic text.

6. The method of claim 1, wherein the variational inference operation comprises a filtering algorithm comprising:

initializing a plurality of variational parameters for the word embedding vectors;

initializing a plurality of variational parameters for the context embedding vectors; and optimizing the plurality of variational parameters for the word embedding vectors and the plurality of variational parameters for the context embedding vectors using stochastic gradient descent.

7. The method of claim 1, wherein the variational inference operation comprises a smoothing algorithm comprising:

initializing a plurality of variational parameters for the word embedding vectors;

initializing a plurality of variational parameters for the context embedding vectors;

optimizing the plurality of variational parameters for the word embedding vectors using a first bidiagonal matrix; and optimizing the plurality of variational parameters for the context embedding vectors using a second bidiagonal matrix.

8. A non-transitory computer-readable storage medium having computer-readable program code embodied therewith, the computer-readable program code executable to perform an operation comprising:

deriving, based on a corpus of electronic text, a machine learning data model that associates words with corresponding usage contexts over a window of time, wherein the machine learning data model comprises a plurality of skip-gram models, wherein each skip-gram model comprises a word embedding vector and a context embedding vector for a respective time step associated with the respective skip-gram model, wherein deriving the machine learning data model comprises applying a diffusion process to the word embedding vectors and the context embedding vectors of the plurality of skip-gram models such that the word embedding vectors and the context embedding vectors are aligned to a common frame of reference of time;

generating a smoothed model by applying a variational inference operation over the machine learning data model; and identifying, based on the smoothed model and the corpus of electronic text, a change in a semantic use of a word over at least a portion of the window of time.

9. The computer-readable storage medium of claim 8, the operation further comprising:

prior to identifying the change in the semantic use of the word, receiving a request to monitor the semantic use of the word;

monitoring the semantic use of the word based on the smoothed model and new text added to the corpus of electronic text;

identifying the change in the semantic use of the word based on at least one of: (i) a distance between two word embedding vectors of the plurality of skip-gram models, or (ii) a distance between two context embedding vectors of the plurality of skip-gram models;

generating an indication of the change in the semantic use of the word; and outputting the indication.

10. The computer-readable storage medium of claim 8, wherein the word embedding vectors of the plurality of skip-gram models comprise word embeddings for each word in the corpus of electronic text, wherein the context embedding vectors of the plurality of skip-gram models comprise context embeddings for each word in the corpus of electronic text, wherein the operation further comprises segmenting each text element in the corpus of electronic text into a respective time step of a plurality of time steps based on a respective timestamp of each text element, wherein the plurality of time steps comprises each time step associated with the plurality of skip-gram models.

11. The computer-readable storage medium of claim 8, wherein the corpus of electronic text includes a plurality of pairs of words, wherein deriving the machine learning data model further comprises:

generating a positive count matrix, wherein the positive count matrix specifies, for each of the plurality of pairs of words in the corpus of electronic text, a respective count of observed occurrences of each respective pair of words within a predefined window of words in a text element of each time step.

12. The computer-readable storage medium of claim 8, wherein deriving the machine learning data model further comprises:

generating a negative count matrix based on a plurality of rejected pairs of words in a second training corpus of text.

13. The computer-readable storage medium of claim 8, wherein the variational inference operation comprises a filtering algorithm comprising:
  initializing a plurality of variational parameters for the word embedding vectors of the plurality of skip-gram models;
  initializing a plurality of variational parameters for the context embedding vectors of the plurality of skip-gram models; and
  optimizing the plurality of variational parameters for the word embedding vectors and the plurality of variational parameters for the context embedding vectors using stochastic gradient descent.

14. The computer-readable storage medium of claim 8, wherein the variational inference operation comprises a smoothing algorithm comprising:
  initializing a plurality of variational parameters for the word embedding vectors of the plurality of skip-gram models;
  initializing a plurality of variational parameters for the context embedding vectors of the plurality of skip-gram models;
  optimizing the plurality of variational parameters for the word embedding vectors using a first bidiagonal matrix; and
  optimizing the plurality of variational parameters for the context embedding vectors using a second bidiagonal matrix.

15. A system, comprising:
  a computer processor; and
  a memory containing a program which when executed by the computer processor performs an operation comprising:
    deriving, based on a corpus of electronic text, a machine learning data model that associates words with corresponding usage contexts over a window of time, wherein the machine learning data model comprises a plurality of skip-gram models, wherein each skip-gram model comprises a word embedding vector and a context embedding vector for a respective time step associated with the respective skip-gram model, wherein deriving the machine learning data model comprises applying a diffusion process to the word embedding vectors and the context embedding vectors of the plurality of skip-gram models such that the word embedding vectors and the context embedding vectors are aligned to a common frame of reference of time;
    generating a smoothed model by applying a variational inference operation over the machine learning data model; and
    identifying, based on the smoothed model and the corpus of electronic text, a change in a semantic use of a word over at least a portion of the window of time.

16. The system of claim 15, the operation further comprising:
  prior to identifying the change in the semantic use of the word, receiving a request to monitor the semantic use of the word;
  monitoring the semantic use of the word based on the smoothed model and new text added to the corpus of electronic text;
  identifying the change in the semantic use of the word based on at least one of: (i) a distance between two word embedding vectors of the plurality of skip-gram models, or (ii) a distance between two context embedding vectors of the plurality of skip-gram models;
  generating an indication of the change in the semantic use of the word; and
  outputting the indication.

17. The system of claim 15, wherein the word embedding vectors of the plurality of skip-gram models comprise word embeddings for each word in the corpus of electronic text, wherein the context embedding vectors of the plurality of skip-gram models comprise context embeddings for each word in the corpus of electronic text, wherein the operation further comprises segmenting each text element in the corpus of electronic text into a respective time step of a plurality of time steps based on a respective timestamp of each text element, wherein the plurality of time steps comprises each time step associated with the plurality of skip-gram models.

18. The system of claim 15, wherein the corpus of electronic text includes a plurality of pairs of words and wherein deriving the machine learning data model further comprises:
  generating a positive count matrix, wherein the positive count matrix specifies, for each of the plurality of pairs of words in the corpus of electronic text, a respective count of observed occurrences of each respective pair of words within a predefined window of words in a text element of each time step; and
  generating a negative count matrix based on a plurality of rejected pairs of words in a second training corpus of electronic text.

19. The system of claim 15, wherein the variational inference operation comprises a filtering algorithm comprising:
  initializing a plurality of variational parameters for the word embedding vectors of the plurality of skip-gram models;
  initializing a plurality of variational parameters for the context embedding vectors of the plurality of skip-gram models;
  optimizing the plurality of variational parameters for the word embedding vectors and the plurality of variational parameters for the context embedding vectors using stochastic gradient descent.

20. The system of claim 15, wherein the variational inference operation comprises a smoothing algorithm comprising:
  initializing a plurality of variational parameters for the word embedding vectors of the plurality of skip-gram models;
  initializing a plurality of variational parameters for the context embedding vectors of the plurality of skip-gram models;
  optimizing the plurality of variational parameters for the word embedding vectors using a first bidiagonal matrix; and
  optimizing the plurality of variational parameters for the context embedding vectors using a second bidiagonal matrix.

* * * * *

UNITED STATES PATENT AND TRADEMARK OFFICE
CERTIFICATE OF CORRECTION

PATENT NO. : 11,068,658 B2
APPLICATION NO. : 15/828884
DATED : July 20, 2021
INVENTOR(S) : Stephan Marcel Mandt et al.

Page 1 of 2

It is certified that error appears in the above-identified patent and that said Letters Patent is hereby corrected as shown below:

In the Specification

In Column 5, Line 62, delete "$n_t^-$" and insert -- $n_t^+$ --, therefor.

In Column 6, Lines 2-3, delete "$(n_t^-, n_t^-)$," and insert -- $(n_t^+, n_t^-)$, --, therefor.

In Column 6, Line 19, delete "$n_t^-, n_t^-$" and insert -- $n_t^+, n_t^-$ --, therefor.

In Column 10, Lines 13-15, delete

"$$q(U_t, V_t) = \prod_{i=1}^{L} N\left(u_{i,t}; u_{ui,t}, \sum_{ui,t}\right) N\left(v_{i,t}; \mu_{vi,t}, \sum_{vi,t}\right)$$" and insert --
$$q(U_t, V_t) = \prod_{i=1}^{L} N(u_{i,t}; \mu_{ui,t}, \Sigma_{ui,t}) N(v_{i,t}; \mu_{vi,t}, \Sigma_{vi,t})$$
--, therefor.

In Column 11, Lines 1-4, delete

"$$\tilde{\sum}_{ui,t} = \left[\tilde{\sum}_{ui,t-1} + \sigma_t^2 I\right]^{-1} + \left(\frac{1}{\sigma_0^2}\right) I\right]^{-1}$$" and Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,068,658 B2 insert -- $\tilde{\Sigma}_{ui,t} = [(\tilde{\Sigma}_{ui,t-1} + \sigma_t^2 I)^{-1} + \left(\frac{1}{\sigma_0^2}\right) I]^{-1}$ --, therefor.

In the Claims

In Column 17, Line 32, in Claim 4, delete "comprises:" and insert -- comprises --, therefor.

In Column 17, Line 40, in Claim 5, delete "comprises:" and insert -- comprises --, therefor.

In Column 18, Line 55, in Claim 11, delete "comprises:" and insert -- comprises --, therefor.

In Column 18, Line 64, in Claim 12, delete "comprises:" and insert -- comprises --, therefor.

In Column 20, Line 43, in Claim 19, after "models;" insert -- and --.